United States Patent [19]

Koizumi

[11] Patent Number: 5,007,509
[45] Date of Patent: Apr. 16, 1991

[54] BRAKE SYSTEM

[75] Inventor: Yoshihisa Koizumi, Fujisawa, Japan

[73] Assignee: Isuzu Motors Limited, Tokyo, Japan

[21] Appl. No.: 416,084

[22] Filed: Oct. 2, 1989

[30] Foreign Application Priority Data

Oct. 31, 1988 [JP] Japan .................................... 273026

[51] Int. Cl.⁵ ............................................ F16D 57/06
[52] U.S. Cl. ................................. 188/271; 188/291; 188/294
[58] Field of Search ............... 188/271, 272, 275, 280, 188/291, 293, 294

[56] References Cited

U.S. PATENT DOCUMENTS

| | | | |
|---|---|---|---|
| 1,416,822 | 5/1922 | Heath | 188/291 |
| 1,677,481 | 7/1928 | Lareva | 188/291 |
| 3,155,197 | 11/1964 | Lee et al. | 188/291 X |
| 3,265,162 | 8/1966 | Botterill | 188/271 |
| 3,373,847 | 3/1968 | Rohacs | 188/272 |
| 4,484,668 | 11/1984 | Williamson | 188/271 |

Primary Examiner—Duane A. Reger
Attorney, Agent, or Firm—Dykema Gossett

[57] ABSTRACT

A brake system comprises an impeller selectively connected to a propeller shaft of a vehicle for consuming energy of the engine and applying a brake force to the propeller shaft, an impeller housing for rotatably housing the impeller and defining an air passage for introducing/discharging external air to/from the impeller, a throttle valve disposed in the air passage upstream of the impeller for adjusting the air flow rate in the air passage, and a negative pressure actuator for moving the throttle valve in accordance with the air flow rate in the air passage. The throttle valve is moved by the negative pressure actuator in accordance with the air flow rate in the air passage. In other words, the brake system adjusts the brake force mechanically by itself in a manner such that an excessive brake force is never applied to the propeller shaft. The brake system does not require a cooling device and only requires a simple arrangement for controlling the brake force.

19 Claims, 3 Drawing Sheets

BRAKE SYSTEM

BACKGROUND OF THE INVENTION

TECHNICAL FIELD

The present invention relates to a brake system for a vehicle, and particularly to a brake system applying a brake force of various strengths to an element of a power transmission line of the vehicle.

BACKGROUND ART

Generally, a large amount of heat exchange takes place in braking a large vehicle, such as a large bus or truck, and usually such a vehicle is equipped with an auxiliary brake system in addition to a main brake system (e.g. a foot brake).

In one type of auxiliary brake system, such as an exhaust brake, the auxiliary brake system produces a force which is transmitted from the vehicle's wheels toward the engine of the vehicle. The crankshaft of the engine is rotated by such force, thereby decelerating the engine.

In another type, a rotor is selectively connected with a crankshaft or a propeller shaft of the vehicle in a manner such that it consumes energy of the engine when it is rotated by the engine. The consumed energy serves as a brake force to the engine. An electrical retarder and a fluid retarder are the typical brake systems employing the rotor.

FIG. 8 of the accompanying drawings illustrates the fluid retarder a. In the illustration, the fluid retarder a serves as a part of a power transmission line d of a vehicle which connects an engine b with wheels c. In the retarder a, an eddy of fluid, such as water or oil, is generated between a rotor e fixed to an output side of the retarder a and a stator f fixed to an input side of the retarder a, thereby absorbing energy from the engine and then converting the energy to heat. The fluid is cooled by a heat exchanger h provided in tank g.

The electrical retarder has electromagnets and a rotor which rotates between the electromagnets. An eddy current (Foucault current) is produced when the rotor rotates, and it is expelled in the form of ohmic heat.

The above-mentioned retarder converts the torque on its outputs side to heat energy, thereby applying a brake force to the engine. Therefore, a device for cooling a working medium (fluid or a rotor) is necessary in order to raise the braking efficiency. The cooling device raises the cost of the auxiliary brake system and makes the arrangement complicated.

On the other hand, the assignee of the present invention has developed another type of auxiliary brake system. This brake system employs an impeller connected to a member of a power transmission line of the vehicle, for example a propeller shaft. The impeller is driven by energy from the propeller shaft and draws in external air. When the impeller consumes energy of the engine, a brake force is applied to the engine. In this arrangement, the brake force increases as the air introduced to the impeller increases. Therefore, if too much air is introduced to the impeller, a too large brake force is applied to the propeller shaft. This may result in breakdown of the power transmission line of the vehicle, and smooth deceleration cannot be achieved.

SUMMARY OF THE INVENTION

One object of the present invention is to provide a brake system which does not require a cooling device.

Another object of the present invention is to provide a brake system whose brake force is easily adjustable.

Still another object is to provide a brake system whose brake force is mechanically self-adjusted in a manner such that excessive brake force is not applied to the engine.

According to one aspect of the present invention, there is provided a brake system which comprises an impeller connected to a member of a power transmission line of a vehicle, such as a propeller shaft, for applying a brake force to the propeller shaft, an impeller housing for rotatably housing the impeller and defining an air passage for introducing/discharging external air to/from the impeller, a throttle valve disposed in the air passage upstream of the impeller for adjusting the air flow rate in the air passage, and control means for actuating the throttle valve in accordance with the air flow rate in the air passage.

The air passage includes an intake passage for introducing the air to the impeller and a discharge passage for expelling the air from the impeller. In the preferred embodiment, the throttle valve is located in the intake passage. The throttle valve is controlled by valve control means, namely a negative pressure actuator. The negative pressure actuator includes a negative pressure chamber communicating with the discharge passage, a diaphragm defining the negative pressure chamber and driven by the negative pressure from the discharge passage, and a rod connected to the diaphragm at one end thereof and connected to the throttle valve at the other end thereof for moving the throttle valve with the diaphragm. As the air flow rate increases in the discharge passage, the pressure in the discharge passage decreases since the cross-sectional area of the discharge passage is constant. The diaphragm of the negative pressure actuator is driven by the negative pressure in the negative pressure chamber derived from the discharge passage. The movement of the diaphragm is transmitted to the throttle valve via the rod, thereby throttling the intake passage. According to this arrangement, as the impeller is driven by the energy from the engine, a brake force is applied to the engine. At the same time, an amount of air to be introduced to the impeller is adjusted by the throttle valve and the control means. The control means adjusts the valve, i.e., the air flow rate in the intake passage, in accordance with the air flow rate in the discharge passage. In other words, the brake system of the present invention mechanically self-adjusts the brake force. The brake system does not require a cooling device in order to raise the braking efficiency since it is not necessary to cool the working medium (the external air). Also, an excessively large brake force is not applied to the power transmission line of the vehicle. In addition, stable deceleration is ensured. Furthermore, the brake system only needs a simple control arrangement.

DESCRIPTION OF THE PREFERRED EMBODIMENTS

A preferred embodiment of the present invention will now be described with reference to the accompanying drawings.

Figure 1:
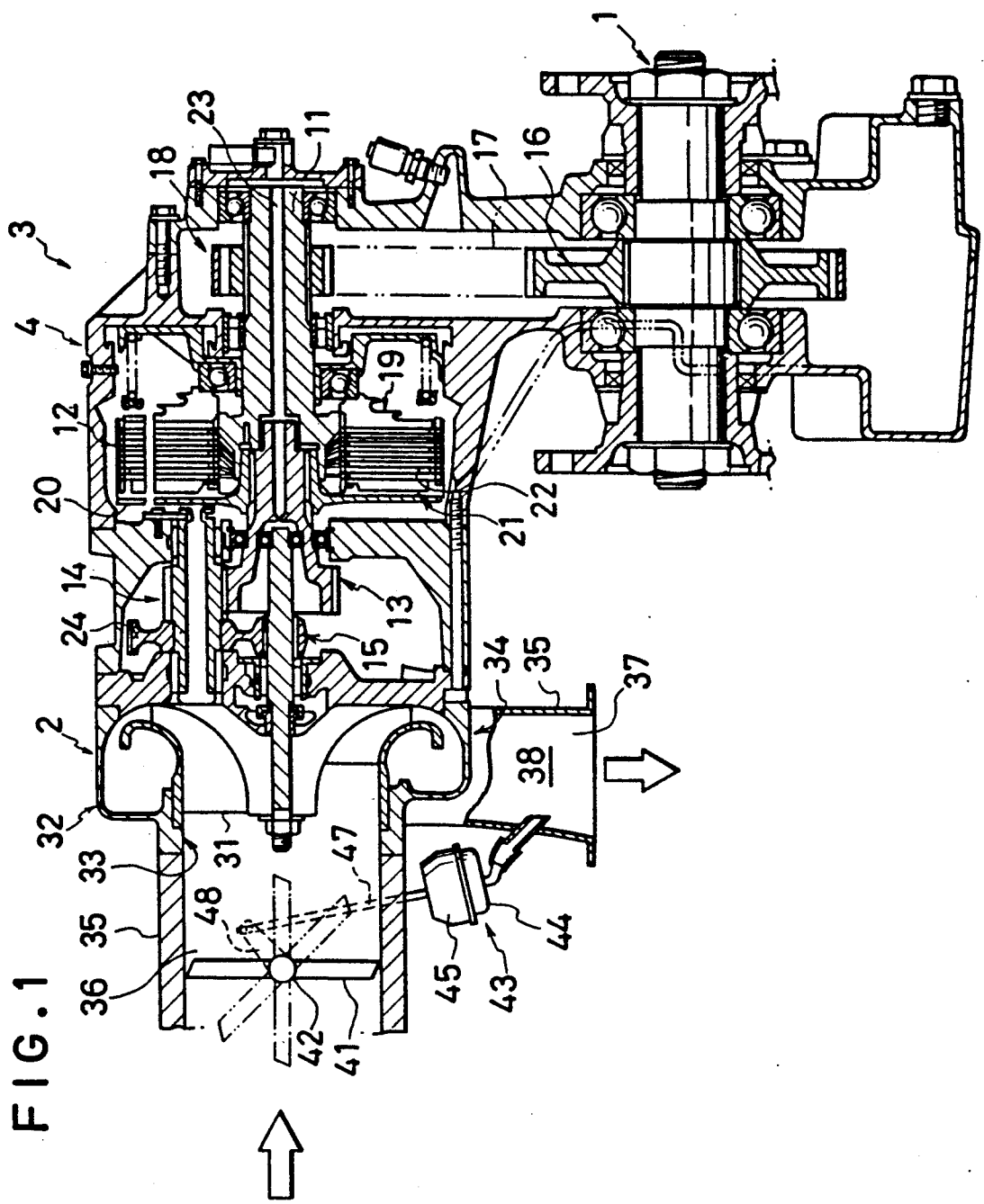
FIG. 1 is a sectional view of the brake system of the present invention.

Referring to FIG. 1, numeral 1 designates an output shaft of an engine such as a propeller shaft. A brake system line 3 extends from the output shaft 1, and an impeller 31 is attached to the end of the brake system line 3. Therefore, the energy of the engine is transmitted from the output shaft 1 to the impeller 2. The brake system line 3 is housed in a casing 4. The brake system line 3 includes, as its major elements, a clutch shaft 11 extending parallel to the output shaft 1, a coupling 13 coaxially connected to the clutch shaft 11 via a clutch 12, an intermediate shaft 14 connected with the coupling 13, and an impeller shaft 15 extending parallel to and connected with the intermediate shaft 14. More specifically, an output gear 16 is fixed on the output shaft 1 at the center of the output shaft 1, and the output gear 16 meshes with an idle gear 17 between the output shaft 1 and the clutch shaft 11. A speed increasing gear 18 is fixed on the clutch shaft 11 which meshes with the idle gear 17. The clutch 12 is provided at the output end of the clutch shaft 11.

The clutch 12 includes a clutch wheel 19 and a clutch housing 20. A first set of clutch plates 21 is mounted on the clutch wheel 19 and a second set of clutch plates 22 is mounted on the clutch housing 20 in a manner such that these plates 21 and 22 are alternatively engaged with each other due to oil supplied from an oil source (not shown) through a bore 23 formed in the clutch shaft 11. When the clutch plates 21 and 22 are engaged with each other, the clutch shaft 11 and the coupling 13 are connected with each other.

A gear formed on the coupling 13 meshes with a gear formed on the intermediate shaft 14 at the output end of the coupling 13. An output gear 24 is fixed on the intermediate shaft 14 and meshes with a gear part formed on the impeller shaft 15. The impeller shaft 14 is coaxial with the coupling 13.

An impeller housing 32 is attached to the main casing 4. An inlet 33 of the impeller 31 is formed in the impeller housing 32 in the axial direction of the impeller 31 while an outlet for the impeller 34 is formed in the impeller housing 32 in the radial direction of the impeller 31. An intake passage 36 extends upstream from the inlet 33 in the axial direction of the impeller 31. A discharge passage 37 extends downstream from the outlet 34 in the radial direction of the impeller 31. The impeller housing 32 has a passage wall 35 defining the intake and discharge passages 36 and 37. The impeller 31 is rotatably housed in the impeller housing 32. The inlet passage 36 introduces an atmosphere air in the axial direction of the impeller 31 while the outlet passage 37 expels the air compressed by the impeller 31 in the radial direction of the impeller 31. An air passage 38 of the impeller 31 is defined by the inlet passage 36 and the outlet passage 37.

In this invention, it should be noted that there is provided a rotatable throttle valve 42 in the air passage 38. In this embodiment, the throttle valve 41 is rotatably supported by a shaft 42 in the inlet passage 36 and is provided with throttle control means 43 for changing the position thereof.

Figure 2:
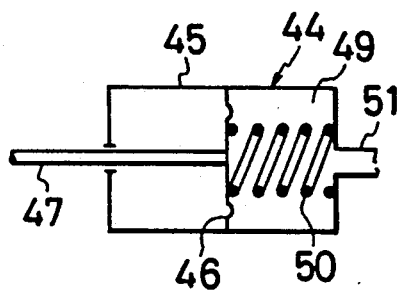
FIG. 2 illustrates an essential part of the brake system of FIG. 1.

The throttle control means 43 adjusts the inclination of the valve 41 so as to adjust the air flow rate in the inlet passage 36. The control means 43 includes a negative pressure actuator 44. The negative pressure actuator 44 includes, as shown in FIG. 1, a pressure chamber 45 which is divided into two chambers by a diaphragm 46 transversely extending in the pressure chamber 45, as shown in FIG. 2.

A rod 47 is fixed on one face of the diaphragm 46 at one end thereof. Referring back to FIG. 1, the rod 47 extends out of the pressure chamber 45 and is connected to an arm 48 via a hinge at the other end thereof. The arm 48 is fixed to the shaft 42 of the valve 41. The rod 47 and the arm 48 constitute a linkage for rotating the valve 41 by a maximum of 90 degrees with the shaft 42 being the rotation center.

The chamber 49 opposite the chamber housing the rod 47 is a negative pressure chamber. In the negative pressure chamber, there is provided a return spring 50 as shown in FIG. 2. Also, a tube 51 extends from the negative pressure chamber 49 to the discharge passage 37 for introducing negative pressure in the discharge passage 37 to move the diaphragm 46. The tube 51 diagonally extends into the outlet passage 37, as illustrated in FIG. 1.

Therefore, in this embodiment, a negative pressure is applied into the chamber 49 of the diaphragm 46 as the impeller 31 compresses the air and expels it into the outlet passage 37. Then, the negative pressure moves the throttle valve 41 via the linkage 47 and 48. In other words, the valve 41 is mechanically adjusted in accordance with the negative pressure in the outlet passage 37.

When the clutch shaft 11 is connected with the coupling 3 via the clutch 12, the power output from the output shaft 1 is transmitted to the impeller shaft 15, thereby driving the impeller 31. In an actual application, the clutch 12 is engaged by hydraulic power when a vehicle driver wants to stop or decelerate the vehicle.

When the impeller 31 is driven, the air drawn into the inlet passage 36 is compressed by the impeller 31 and expelled through the outlet passage 37. The impeller 31 consumes energy of the engine in order to compress the air, whereby brake energy is applied to the output shaft 1, for example a propeller shaft, of the engine.

Figure 3:
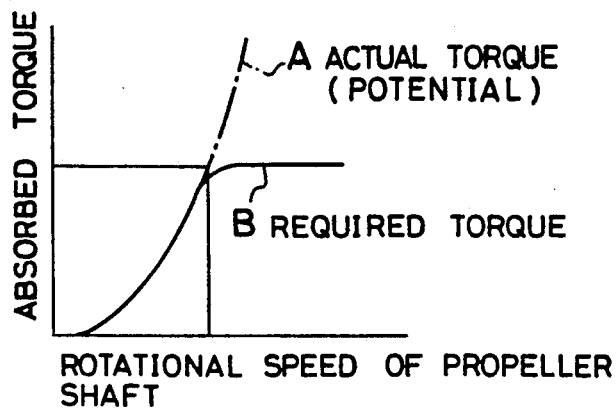
FIG. 3 is a diagram showing the relation between the rotation speed of the propeller shaft and the absorbed torque.

In this case, if too much air is introduced to the impeller 31, the brake force applied to the propeller shaft 1 becomes too large. This may result in a breakdown of the power transmission line of the vehicle and/or an unstable deceleration of the vehicle. FIG. 3 shows the relation between the rotational speed of the propeller shaft (revolutional speed of the engine) (horizontal axis) and the absorbed torque (brake force) (vertical axis). As seen from FIG. 3, the dashed line A (actual brake force) is far greater than the solid line B (required brake force) at a rotational speed beyond a certain value.

As mentioned above, one object of the present invention is to adjust the absorbed torque constant when the propeller shaft or the engine rotates at high rotational speed, as in curve A in FIG. 3.

The operation of the brake system of the present invention will now be described.

Referring again to FIG. 1, when the air flow rate in the discharge passage 37 is small, no negative pressure is exerted on the actuator 44, so that the throttle valve 41 stays horizontal (full open) as indicated by a single-dot line in FIG. 1. When an amount of the compressed air passing through the outlet passage 37 increases, the speed of the compressed air increases since the sectional area of the outlet passage 37 is constant. Thereupon, the negative pressure applied to the actuator 44 increases, and then the actuator 44 gradually rotates the throttle valve 41 clockwise as indicated by the double-dot line in FIG. 1. Therefore, the amount of air to be supplied to the impeller 31 drops. Accordingly, the load to the impeller 31 decreases and the absorbed torque, i.e., the brake force transmitted to the propeller shaft 1, does not increase or may be maintained constant.

Figure 4:
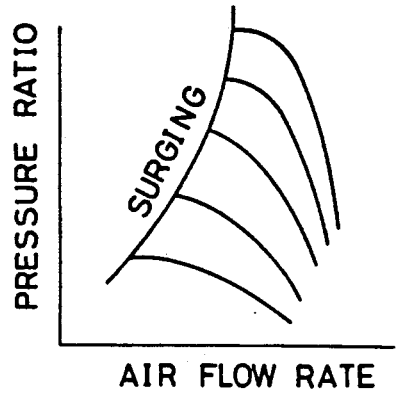
FIGS. 4 and 5 are diagrams showing the relation between the air flow rate and the compression ratio respectively.
Figure 5:
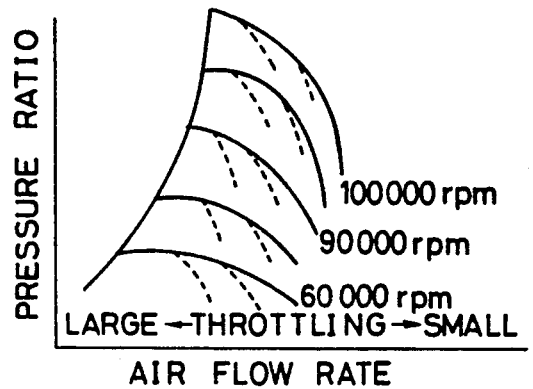

FIGS. 4 and 5 show characteristics of the brake system of the present invention respectively, in which the horizontal axes indicate the air flow rate, and the vertical axes indicate a pressure ratio respectively. The pressure ratio is a ratio of an absolute pressure at the outlet to an absolute pressure at the inlet.

As shown in FIG. 4, the pressure ratio decreases as the air flow rate increases. Referring to FIG. 5, the air flow rate decreases when the throttling by the valve 41 becomes large, namely in a high-speed range between 60,000 rpm and 100,000 rpm, as indicated by the dashed line in FIG. 5.

Figure 6:
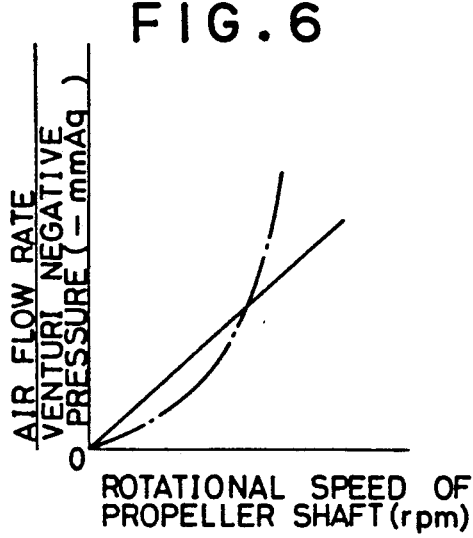
FIG. 6 is a diagram showing the relation between the rotational speed of the propeller shaft, the air flow rate and the venturi negative pressure.

In FIG. 6, the horizontal axis indicates the rotational speed of the propeller shaft (revolutional speed of the engine), and the vertical axes indicate the air flow rate as well as the venturi negative pressure. The solid line indicates the air flow rate and the single-dot line indicates the venturi negative pressure.

As shown in FIG. 6, the air flow rate increases with the rotational speed of the propeller shaft proportionally (solid line) whereas the venturi negative pressure increases with the rotational speed of the propeller shaft nonlinearly (dashed line). However, the difference between the air flow rate and the venturi negative pressure is slight, so that they have a similar tendency. In this embodiment, the venturi negative pressure is considered proportional to the revolutional speed of the propeller shaft, and its proportional constant is equal to that of the air flow rate.

Figure 7:
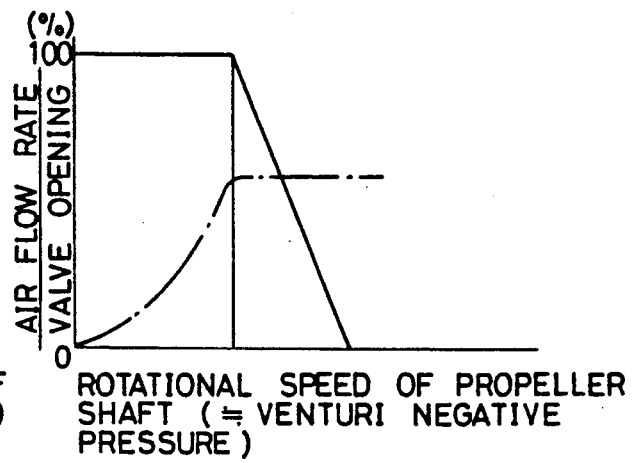
FIG. 7 is a diagram showing the relation between the rotational speed of the propeller shaft, the air flow rate and throttling degree of the throttle valve.
Figure 8:
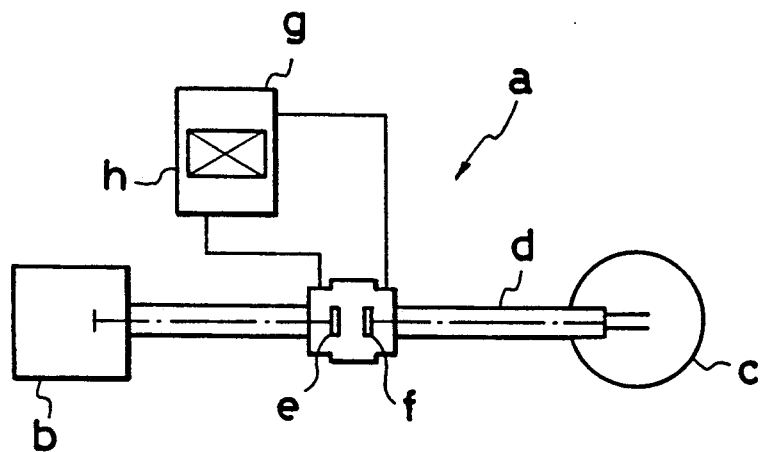
FIG. 8 illustrates the prior art brake system.

Thereupon, FIG. 7 shows a diagram of which the horizontal axis represents the venturi negative pressure instead of rotational speed of the propeller shaft. The vertical axis represents the air flow rate and the degree of throttling by the valve 41.

When the propeller shaft rotates at a low or a medium speed, the throttle valve 41 is not adjusted, i.e., the valve 41 is at a full open position. Thus, the amount of the air introduced to the impeller 31 is not adjusted. Accordingly, a brake force corresponding to the amount of the air is applied to the propeller shaft 1. At high speed, however, the throttle valve 41 is adjusted, i.e., the valve throttles the inlet passage, in a manner such that the air flow rate is constant. Therefore, a brake force of constant strength is applied to the propeller shaft 1. Accordingly, possible breakdown of the power transmission line of the vehicle is prevented and stable deceleration is ensured by this brake system.

The movement of the actuator 44 is controlled by employing a different return spring 50.

As mentioned above, the brake system controls the brake force by itself, so that the brake system does not need an external device for controlling the brake force which is usually a complicated device.

Various modifications may be made to the illustrated embodiment. For example, the throttle valve 41 may be disposed in the outlet passage 37. In this case, the throttle valve is adjusted in accordance with the air flow rate in the inlet passage 36. Also, the output shaft 1 may be a crankshaft.

What is claimed is:

1. A brake system for a vehicle, comprising:
    an impeller connected to a member of a power transmission line of the vehicle for applying a brake force to said member;
    means for housing the impeller, and an air passage for introducing or discharging external air to and from the impeller;
    a throttle valve disposed in the air passage for adjusting the air flow rate in the air passage; and
    control means for actuating the throttle valve in accordance with the air flow rate in the air passage.

2. A brake system as defined in claim 1, wherein the impeller is connected to an output shaft of the power transmission line via a clutch.

3. A brake system as defined in claim 1, wherein the air passage includes an intake passage for introducing the air to the impeller and a discharge passage for expelling the air from the impeller, and the throttle valve is rotatably disposed in the intake passage.

4. A brake system as defined in claim 1, wherein the control means adjusts the throttle valve to throttle the air passage to a large extent when the revolutional speed of the impeller is high and to throttle the air passage to a small extent when the revolutional speed of the impeller is either low or medium.

5. A brake system as defined in claim 1, wherein the control means includes a negative pressure actuator for allowing the throttle valve to throttle the air passage a greater amount when the air flow rate in the air passage increases.

6. A brake system as defined in claim 2, wherein the control means includes a negative pressure actuator for allowing the throttle valve to throttle the air passage a greater amount when the air flow rate in the air passage increases.

7. A brake system as defined in claim 3, wherein the control means includes a negative pressure actuator for allowing the throttle valve to throttle the air passage a greater amount when the air flow rate in the air passage increases.

8. A brake system as defined in claim 5, wherein the negative pressure actuator includes a negative pressure chamber connected to the air passage downstream of the impeller, a diaphragm defining the negative pressure chamber and driven by the negative pressure, and a rod connected to the diaphragm at one end thereof and connected to the throttle valve at the other end thereof.

9. A brake system as defined in claim 6, wherein the negative pressure actuator includes a negative pressure chamber connected to the air passage downstream of the impeller, a diaphragm defining the negative pressure chamber and driven by the negative pressure, and a rod connected to the diaphragm at one end thereof and connected to the throttle valve at the other end thereof.

10. A brake system as defined in claim 7, wherein the negative pressure actuator includes a negative pressure chamber connected to the discharge passage, a diaphragm defining the negative pressure chamber and driven by the negative pressure, and a rod connected to the diaphragm at one end thereof and connected to the throttle valve at the other end thereof.

11. A brake system as defined in claim 5, wherein the negative pressure actuator includes a negative pressure chamber connected to the air passage downstream of the impeller, and a return spring for adjusting the movement of the diaphragm as provided in the negative pressure chamber.

12. A brake system as defined in claim 6, wherein the negative pressure actuator includes a negative pressure chamber connected to the air passage downstream of the impeller, and a return spring for adjusting the movement of the diaphragm as provided in the negative pressure chamber.

13. A brake system as defined in claim 7, wherein the negative pressure actuator includes a negative pressure chamber connected to the air passage downstream of the impeller, and a return spring for adjusting the movement of the diaphragm as provided in the negative pressure chamber.

14. A brake system as defined in claim 5, wherein the throttle valve has a shaft at its center of rotation, and the negative pressure actuator includes a linkage mechanism including a rod connected to the diaphragm, a hinge provided at the free end of the rod, and an arm connected to the rod via the hinge at one end thereof and fixed to the throttle valve at the other end thereof.

15. A brake system as defined in claim 6, wherein the throttle valve has a shaft at its center of rotation, and the negative pressure actuator includes a linkage mechanism including a rod connected to the diaphragm, a hinge provided at the free end of the rod, and an arm connected to the rod via the hinge at one end thereof and fixed to the throttle valve at the other end thereof.

16. A brake system as defined in claim 7, wherein the throttle valve has a shaft at its center of rotation, and the negative pressure actuator includes a linkage mechanism including a rod connected to the diaphragm, a hinge provided at the free end of the rod, and an arm connected to the rod via the hinge at one end thereof and fixed to the throttle valve at the other end thereof.

17. A brake system as defined in claim 5, wherein the negative pressure actuator includes a pipe connecting the negative pressure chamber with the air passage downstream of the impeller for leading negative pressure air in the air passage to the negative pressure chamber.

18. A brake system as defined in claim 6, wherein the negative pressure actuator includes a pipe connecting the negative pressure chamber with the air passage downstream of the impeller for leading negative pressure air in the air passage to the negative pressure chamber.

19. A brake system as defined in claim 7, wherein the negative pressure actuator includes a pipe connecting the negative pressure chamber with the air passage downstream of the impeller for leading negative pressure air in the air passage to the negative pressure chamber.

* * * * *